Patented Nov. 27, 1934

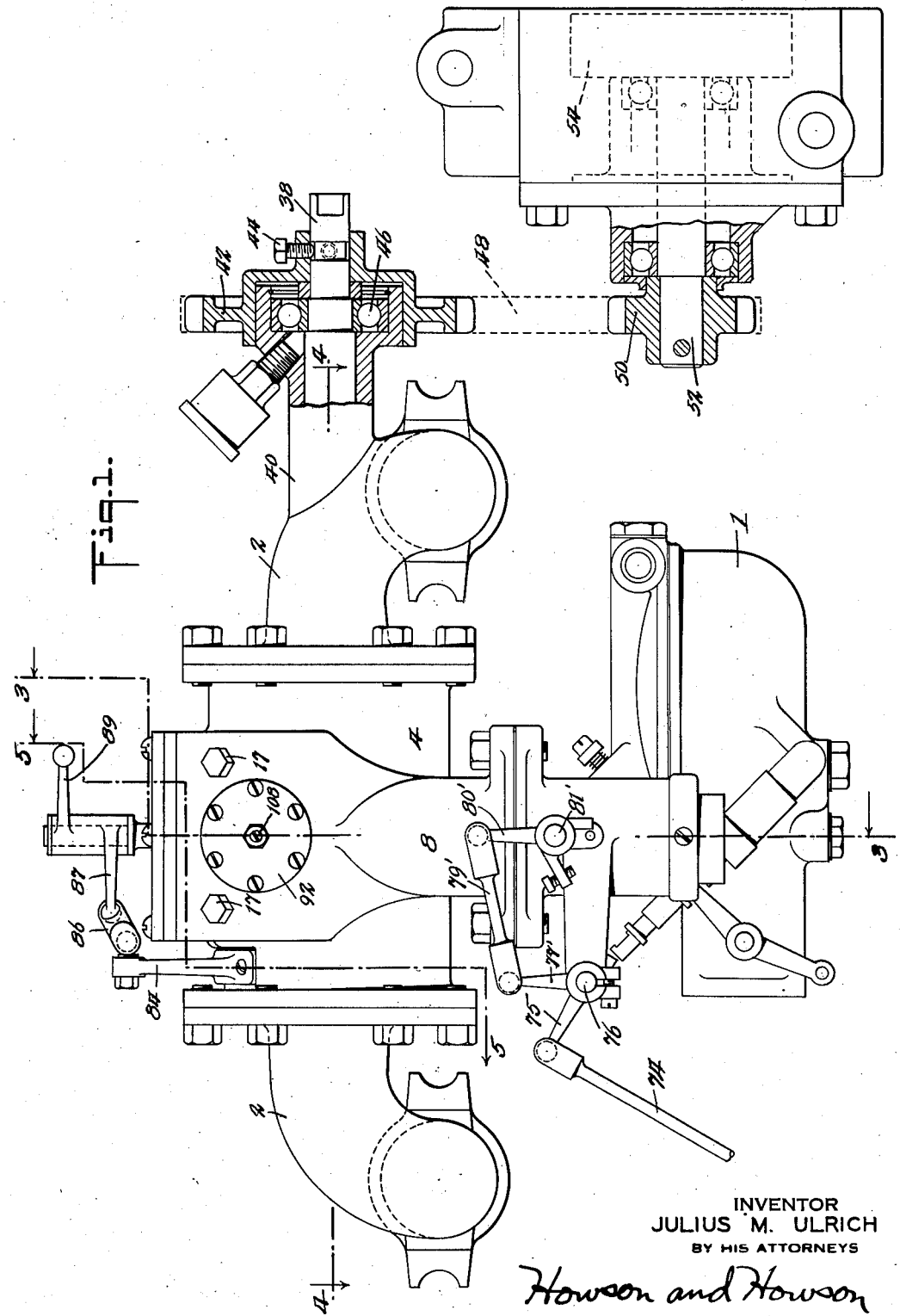

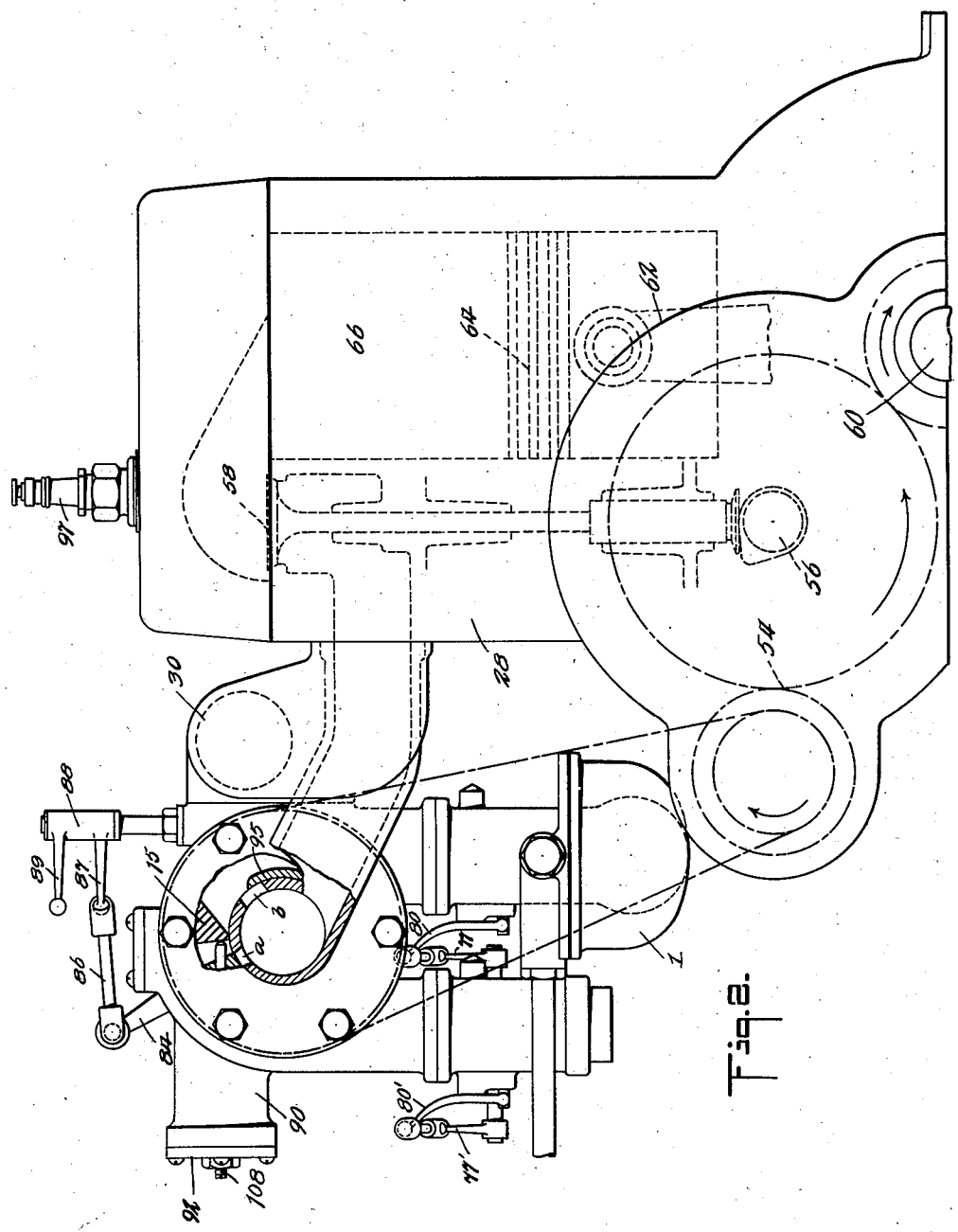

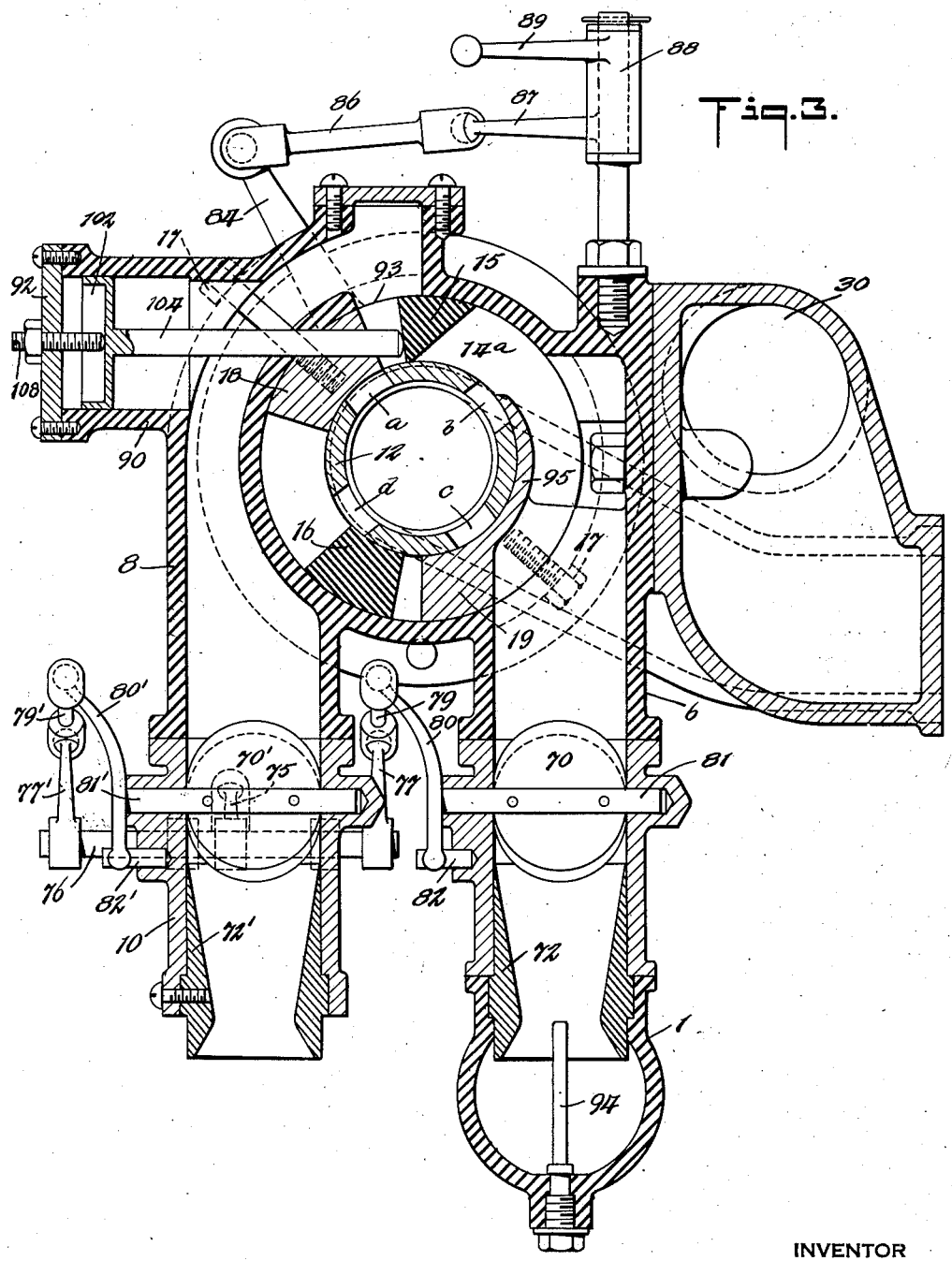

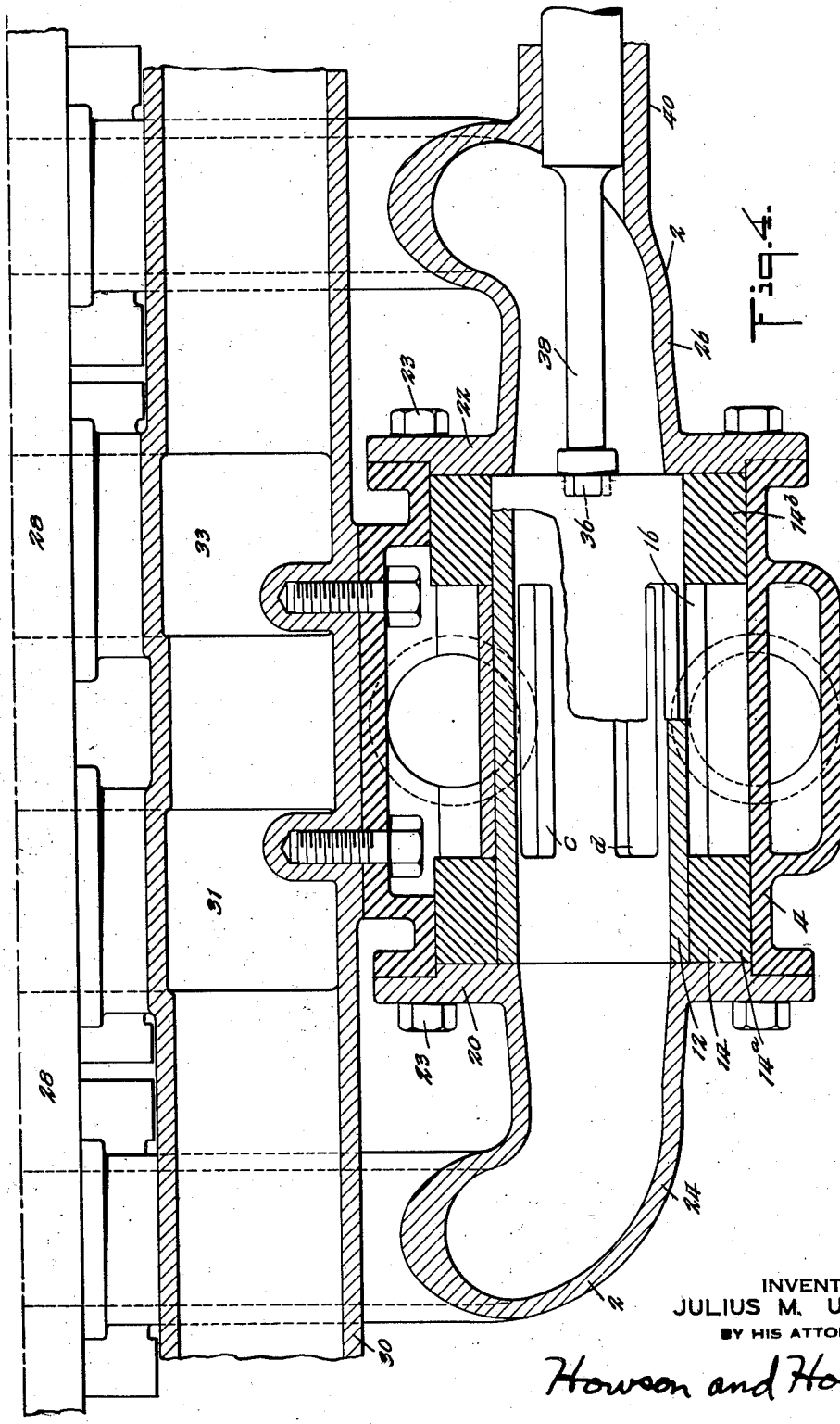

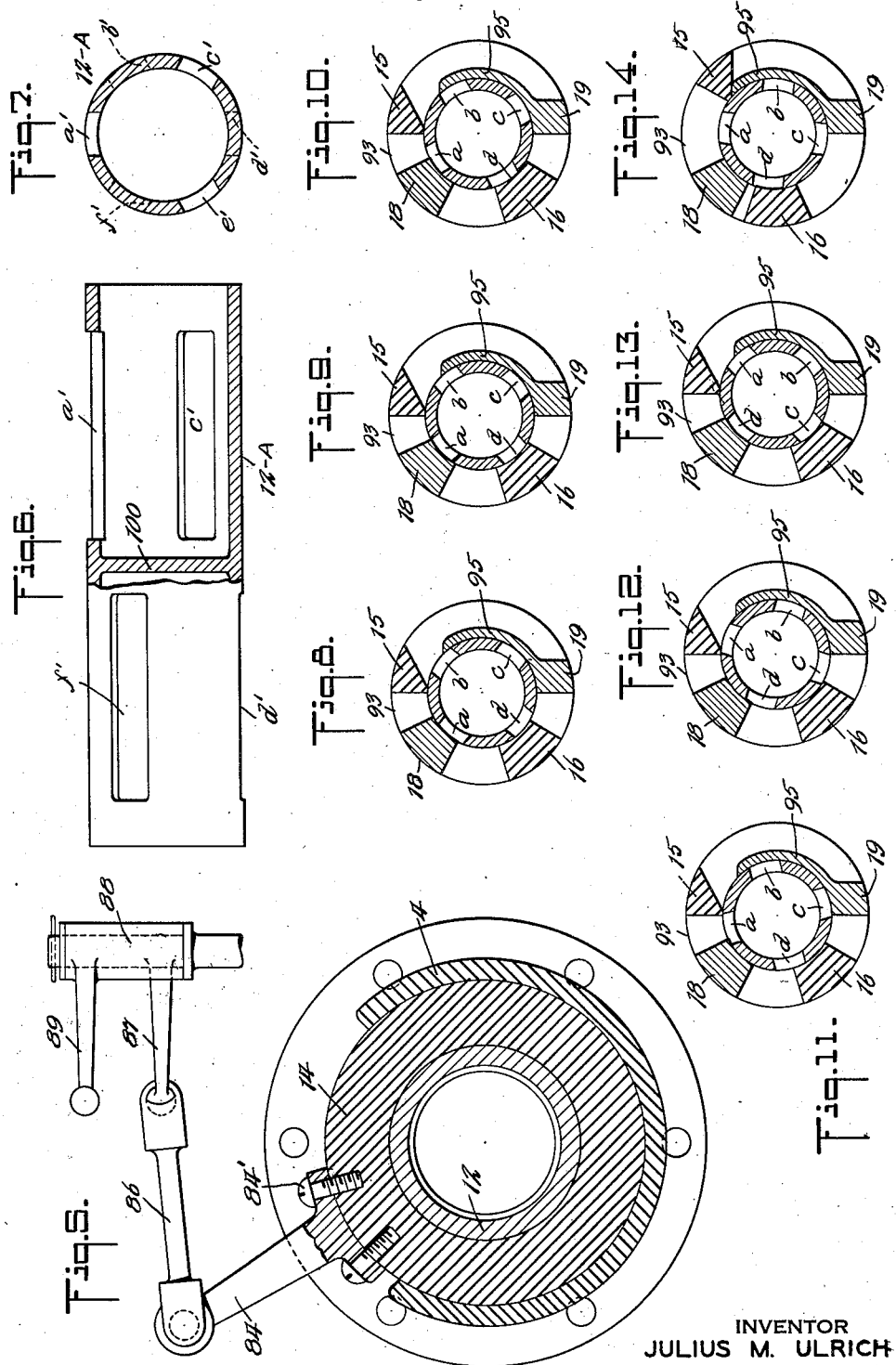

1,982,554

UNITED STATES PATENT OFFICE 1,982,554

INTERNAL COMBUSTION ENGINE

Julius M. Ulrich, Riverside, Conn., assignor to Palmer Bros. Engines, Inc., Cos Cob, Conn., a corporation of Connecticut Application April 20, 1932, Serial No. 606,467

13 Claims. (Cl. 123—75)

This invention relates to internal combustion engines and more particularly to means for regulating the fuel supply to an internal combustion engine of the Otto cycle type and it is an object of this invention to provide a means for supplying to the engine cylinders on each intake or suction stroke a larger volume of air in proportion to the total volume of fuel and air to obtain more complete combustion and it is also an object of this invention to provide means for controlling the admission of air and fuel to the engine cylinders such that air and mixtures of air and fuel may be successively supplied to the engine cylinders on each suction or intake stroke. It is also an object of this invention to provide means for admitting air only to each engine cylinder for a portion of each suction or intake stroke whereby accumulation of condensed fuel in the engine manifold is prevented. It is also an object of this invention to provide means for controlling the admission of fuel to an internal combustion engine of such construction that the fuel may be cut off and air alone admitted to the engine cylinders in case it is desirable to make use of the motor to brake or retard the movement of the car or that the additional air supply may be cut off and the engine supplied with the normal fuel mixture now supplied to engines of this type.

In the drawings:—

Fig. 1 is a view in elevation of such parts of the fuel supply means of an internal combustion engine as are necessary to show the application of this invention thereto, some parts being shown partly in section in order to show such parts more clearly;

Fig. 2 is a view substantially in elevation looking from the front of an internal combustion engine having a fuel supply means constructed in accordance with this invention, some parts being broken away to show other parts more clearly;

Fig. 3 is a central vertical section of the intake manifold and air and fuel connections thereto taken as on line 3—3 of Fig. 1;

Fig. 4 is a horizontal section on the line 4—4 of Fig. 1;

Fig. 5 is a fragmentary vertical section taken on the line 5—5 of Fig. 1;

Fig. 6 is a view partly in elevation and partly in section of a modified construction of rotary valve for use with engines having a different number of cylinders to that for which the construction of Figs. 1 to 5 is designed;

Fig. 7 is a vertical section of the valve shown in Fig. 6; and

Figs. 8 to 14 are partial sectional views taken as on line 3—3 of Fig. 1 and showing various operative positions of the rotary valve controlling the admission of air and fuel during a suction or intake stroke of an engine piston.

In the drawings the invention is illustrated in connection with a four cylinder internal combustion engine of the four-cycle type. Fuel is supplied to the engine cylinders from a carbureter 1 which is of any suitable type and which is connected through an intake manifold 2 to the intake passages and ports of the engine cylinders. Interposed between the intake manifold 2 and the carbureter 1 is a valve casing 4 having a connection 6 leading to the carbureter 1, and a connection 8 leading to an air inlet 10 the connections 8 and 10 serving as supply passages for fuel and air. Within the valve casing 4 is a rotatable cylindrical sleeve valve 12 formed with ports $a, b, c, d$, disposed at angles of 90° and extending for the greater part of the length of the sleeve valve 12. Interposed between the sleeve valve 12 and the casing 4 is a second sleeve valve 14 comprising annular end portions $14^a$ and $14^b$ which rotatably fit the casing 4 and are joined by ribs 15 and 16 which fit the casing 4 and valve 12 as shown in Figure 3. Secured to the casing 4 by bolts 17 and fitting in openings in the sleeve valve 14 are blocks 18 and 19, the inner surfaces of which are cylindrical and fit the outer surface of the sleeve valve 12. The ends of the valve casing 4 are closed by caps 20 and 22 secured to the valve casing by bolts 23 and having openings therein which communicate with the openings in the ends of the sleeve valve 12. Formed integral with the caps 20 and 22 are the tubular portions 24 and 26 which form the intake manifold 2 and connect the central passage of valve 12 with the passages in the cylinder block 28 leading to the intake valves of the various cylinders, the connection 24 leading to two cylinders at one side of the valve casing 4 while the connection 26 leads to two cylinders at the other side of the valve casing 4.

In keeping with the usual practice an exhaust manifold 30, having connections 31, 33 leading to the exhaust valves of the cylinders, is provided. In Figure 4 only a portion of the exhaust manifold is shown, the connections 31 and 33 being those to the inner or center cylinders of the cylinder block.

One end of the sleeve valve 12 is engaged by a spider 36 to establish a connection to a shaft 38 which projects through an extension 40 of the manifold connection 26 and has attached at the outer end thereof a sprocket 42 secured upon the shaft 38 by a set screw 44. As shown, the shaft 38 is journalled in a bearing 46 housed in the end of the extension 40. The sprocket 42 is driven by means of a chain 48 which engages a sprocket 50 driven by a shaft 52 which in turn is driven in a suitable manner from timing gears 54 or other suitable rotating part of the engine. It will be noted that the driving means for the shaft 38 is arranged to drive the shaft 38 at the same speed as the cam shaft 56 which serves to operate the inlet valves 58 and the exhaust valves, not shown, of the engine so that the valve 12 may be timed to operate with the inlet valves 58 of the engine. In the usual practice the cam shaft 56 rotates at half the speed of the crank shaft 60 which is connected through the connecting rods 62 to the pistons 64 in the engine cylinders 66.

In the fuel supply passage 6 leading from the carbureter there is arranged the usual throttle valve 70 and Venturi tube 72. In the air supply passage 8, in order that the air inlet may be controlled in a similar manner, there is arranged a similar throttle valve 70' and a similar Venturi tube 72'. The valves 70 and 70' are operated by means of a rod 74 connected to the usual controls at the operator's position and connecting through lever 75 with shaft 76 to which are attached the crank arms 77 and 77'. The arm 77 is connected through link 79 to crank arm 80 fixed on the shaft 81 of the throttle valve 70 while crank arm 77' is connected through link 79' to the crank arm 80' fixed on the shaft 81' of the throttle valve 70'. Stops 82 and 82' limit the movement of the valves 70 and 70' in the opening direction.

To operate the sleeve valve 14 there is provided a lever arm 84 which extends through a slot in the valve casing 4 and is secured to the sleeve valve 14 by screws 84'. A link or rod 86 connects the lever arm 84 to an arm 87 of a bell crank lever 88 the other arm 89 of which is connected by suitable means, not shown, to an operating mechanism extending to a position convenient to the operator. An adjustable stop 108, mounted in cover 92 of cylinder 90 and engaging piston 102 therein limits the movement of the valve 14 in one direction. As shown in Figures 1, 3 and 4 the air inlet 8 is extended about the casing 4 so as to connect with a port 93 in the upper portion of the casing 4, the block 18 forming a fixed wall for the port while the rib 15 of the valve 14 forms a movable wall for the port and provides a means whereby the size of the port 93 leading from the air inlet 8 to the sleeve valve 12 may be varied or adjusted. The size of the opening of the port 93 as a rule varies with the size of the fuel supply nozzle 94 of the carbureter 1 and the most satisfactory opening having been once determined under operating conditions, the stop 108 is preferably adjusted and thereafter left in position to limit the closing movement of the valve 14. The block 19 has a portion 95 which engages the sleeve valve 12 and forms a wall continuing the fuel supply passage 6 to the sleeve valve 12 adjacent the rib 15. The rib 15 tapers to a sharp edge adjacent the valve 12 and the sides thereof are at such an angle that the side adjacent the block 18 is parallel to the adjacent side of the block 18 when moved to engage with the block 18 while the opposite face of the rib 15 is at an angle to seat on the upper surface of the portion 95 of the block 19 which forms a stop for the movement of the block 15 in that direction.

As the engine operates the valve 12 is rotated in a clockwise direction in synchronism with the cam shaft 56 and fuel will pass from the carbureter 1 through the fuel supply passage 6 and through one of the ports $a$, $b$, $c$, $d$, of the valve 12 into the interior of the valve and thence out either one or the other of the ends of the valve into the sections 24 and 26 of the intake manifold and thus to the inlet passages in the engine cylinder block. Air will pass through the air inlet 8 and the port 93 between the block 18 and the rib 15 to the ports in the valve 12 and the interior of the valve 12 and thence to the inlet passages in the engine cylinder block. The flow through the passages 6 and 8 is simultaneously controlled by the throttle valves 70 and 70' through their common operating mechanism while the flow through them is substantially the same under similar conditions owing to the provision of similar Venturi tubes 72, 72' in the supply passages 6 and 8, that is the venturi in the respective passages are properly proportioned to the capacities of the respective passages.

In the usual timing of the inlet valves of a four cylinder four-cycle engine such as is shown in Figs. 1 to 5, the inlet valves are opened during an angular movement of the cam shaft of such extent that there is a short overlap of the openings of the inlet valves, that is, each valve opens shortly before the previously opened valve closes. In operating with the valve 12 arranged between the supply passages 6 and 8 and inlet valves 58 of the engine, the valve 12 is timed so that a port, as port $b$, will establish communication from the fuel supply passage 6 to the intake manifold and be supplying fuel to one cylinder at the time the inlet valve of the cylinder next in order of firing opens and draws fuel from the intake manifold and fuel supply passage 6. The position of the valve 12 will be approximately as shown in Figure 8 at this time. As the valve 12 rotates from the position shown in Fig. 8 supply of fuel to the engine cylinder continues but the opening of the port $b$ gradually diminishes and the port $a$ gradually approaches the air inlet port 93. The port $b$ is positioned, as shown in Figure 9, at the time the port $a$ is just about to open the air supply passage 8 to the fuel stream to the engine cylinder. Continued movement of the valve 12 causes the port $a$ to open to admit air and as the port $a$ gradually increases its opening the port $b$ gradually closes during which period a mixture of air from the air supply passage 8 and fuel from the fuel supply passage 6 is admitted to the engine cylinder until the valve 12 reaches the position shown in Figure 10 where the port $b$ is closed. From the position shown in Fig. 10 until the valve 12 reaches the position shown in Figure 11 the port $a$ alone is open admitting air to the engine cylinder, which air sweeps out the intake manifold of the fuel therein and supplies air to the engine cylinder. This supply of air to the engine cylinder continues until, as shown in Figure 11, the port $a$ passes the edge of the rib 15 of the valve 14 opening the port $a$ to the fuel supply passage 6, thus giving a mixture of air from the passage 8 and fuel from the passage 6 to the engine cylinder. Continued movement of the valve 12 increases the opening of the port $a$ to the passage 6, permitting an increasing amount of fuel to be supplied to the engine cylinder while the opening of port $a$ to the air passage 8 remains the same until the rear edge of the port $a$ passes the face of the block 18, whereupon the air supply is decreased while the fuel supply continues to increase until, as shown in Figure 12, the port $a$ passes the edge of the rib 15 and the inlet from the passage 8 is closed by the valve 12 while the port a is fully open to the fuel passage 6 for the admission of the fuel from the passage 6 to the engine cylinder. The full opening of the port a to the fuel passage 8 continues until the inlet valve of the engine cylinder is closed and meanwhile the inlet valve of a cylinder next in order of firing is opened and the fuel is supplied to that cylinder.

In the arrangement of the valve just described it will be noted that upon the opening of the engine inlet valve fuel is supplied to the engine cylinder and that thereafter the fuel supply is thinned by the admission of air from the air inlet. Subsequently air alone is admitted to the engine cylinder, after which a mixture of air, from the air inlet, and fuel from the fuel inlet, is supplied to the engine cylinder. This mixture of fuel and air gradually increases in richness until the air supply passage 8 is cut off and fuel alone from the fuel supply passage 6 is supplied to the engine cylinder. In this way provision is made for supplying a stratified fuel mixture of varying richness during the suction or intake stroke of the engine piston, but, it will be noted, the richest fuel mixture is supplied at the last portion of the intake stroke so that the richest mixture will be in the region of the ignition means or spark plug 97 upon the completion of the compression stroke of the engine piston and at the beginning of the ignition or work stroke thereof. As each of the ports d, c, and b, follow the port a past the air and fuel inlet ports they, in turn, establish communication therefrom through the intake manifold to engine cylinders whose intake valves are timed to operate with the respective ports of the sleeve valve.

If desired, the adjustment of the stop 108 may be set so as to permit the full movement of the lever arm 84 to the left in Figure 3 in which position the rib 15 engages with the block 18 and closes the air inlet port to the valve 12 so that throughout the rotation of the valve 12 fuel from the fuel inlet 6 only is supplied to the engine cylinder. Operation of the arm 84 in the opposite direction will shift the valve 14 carrying with it the ribs 15 and 16 until the rib 15 engages the upper portion 95 of the block 19 at which time, as shown in Figure 14, the rib 15 completely closes the fuel inlet passage 6 so that fuel is not supplied to the engine cylinder while at the same time the air inlet passage 8 is continuously open to the engine cylinder. In this position of the valve 14 air alone is supplied to the engine cylinders and the engine can be used as a brake in retarding the motion of the vehicle.

To insure free operation of the sleeve valve 14 to the position shown in Fig. 14 when the throttle valves 70 and 70' are substantially closed so that the supply of fuel may be completely cut off and the engine serve as a brake, there is provided a cylinder 90 open at one end to the air inlet passage 8. Mounted in the cylinder 90 is a piston 102 having a plunger 104 which projects through openings in a wall of air inlet 8 and filler block 18 and engages with a face of the rib 15 of the valve 14. The area of the piston 102 is substantially equal to that of the rib 15 so that the effect of the partial vacuum in the air supply passage 8 on the rib 15 when the throttle valve 70' is substantially closed is offset by its effect on the piston 102 with the result the valve 14 is freely movable at all times. To prevent chattering of the plunger 104 on the rib 15 the piston 102 is loosely fitted in the cylinder 90 and permits pressures on opposite sides of the piston to gradually equalize. An adjustable stop 108 may be mounted in the head of the cylinder 90 to limit the outward movement of the piston 102.

While the valve has been shown in Figures 1 to 5 and 8 to 14 arranged for a four cylinder engine it is, of course, possible to arrange the valve for engines having cylinders of greater or less number. In the modified construction shown in Figures 6 and 7 an arrangement of a valve for a six cylinder engine is shown. In this arrangement the sleeve valve 12—A is divided at the center by a partition wall 100 and the air and fuel inlet passages communicate with the ports a', c', e' and b', d', f' in the valve on opposite sides of the partition wall.

In this construction the ports on opposite sides of the partition wall 100 are staggered so that cylinders in each half of the cylinder block are alternately connected to the air and fuel inlet passages following the usual firing order of cylinders in engines of this type. As shown, the ports on each side of the partition wall are arranged at angles of 120° and correspond with the timing of the intake valves in the cylinders in the corresponding half of the cylinder block. In place of the divided valve 12—A of Figs. 6 and 7, separately mounted valves, each controlling the air and fuel inlet to a number of the cylinders may be used so that rotary valves controlling the admission of air and gas to the engine cylinders may be used in connection with engines of the Otto cycle type irrespective of the number of cylinders in the engine.

While the provision of different numbers of ports in the valves 12 and 12—A and the difference in the numbers of engine cylinders occasions some slight variation in the opening and closing of the ports of the valves 12 or 12—A with respect to the opening and closing of the engine intake valves it will be noted that in all arrangements there is a period during which the air inlet port only is open followed by a period during which the air inlet port is gradually closed while the fuel inlet port is gradually opened. This in turn is followed by a period during which fuel alone is supplied to the engine cylinder. In the case of the four cylinder engine the admission of air only occurs after the intake stroke is partly completed and after some fuel has been supplied to the engine cylinder while in the case of the six cylinder engine the admission of air alone occurs at the beginning of the intake stroke. In each case, however, the admission of fuel alone is taking place at the time the intake valve closes so that the richer or more readily ignitable mixture is at the top of the cylinder and in the region of the ignition means.

What is claimed is—

1. The combination with an internal combustion engine having fuel intake passages of separate air and fuel supply passages, a valve casing between said supply passages and said fuel intake passages, a valve in said casing operative to connect said supply passages individually and collectively to said intake passages and means in said valve casing for varying the time ratio of the connections of said supply passages individually to said fuel intake passage, the time of opening said air supply port being constant with respect to the engine suction strokes.

2. The combination with an internal combustion engine having fuel intake passages of separate air and fuel supply passages, a valve casing between said supply passages and said fuel intake passages, a valve in said casing operative to successively connect said fuel intake passages to said air supply passage, to both said air and fuel supply passages, and to said fuel supply passage, said casing having a port common to said supply passages and means adjustably proportioning said port between said passages.

3. The combination with an internal combustion engine having fuel intake passages of separate air and fuel supply passages, a valve casing between said air and fuel supply passages and said fuel intake passages, a valve in said casing controlling the connection of said supply passages to said intake passages, said casing having ports between said supply passages and said valve, means in said valve casing adjustably proportioning the ratio of the open periods of said ports while maintaining constant the period of each suction stroke comprised by the combined open times of said ports and means operating said valve to supply a mixture of fuel and air gradually varying from air alone to a normal fuel mixture during each suction stroke of the engine.

4. The combination with an internal combustion engine having fuel intake passages, of separate air and fuel supply passages, a valve casing between said air and fuel supply passages and said fuel intake passages, a valve in said casing controlling the connection of said supply passages to said fuel intake passages and means operating said valve to supply a fuel mixture gradually increasing in richness during part of each suction stroke, said valve having a port corresponding to each engine cylinder for connecting said air and fuel supply passages successively to said fuel intake passages during the suction stroke of the corresponding cylinder.

5. The combination with an internal combustion engine having fuel intake passages of separate air and fuel supply passages, a valve casing between said supply passages and said fuel intake passages, a valve in said casing controlling the connections of said supply passages to said intake passages, said valve having a port corresponding to each engine cylinder and means operating said valve to connect said air supply passage to a fuel intake passage to supply air thereto, then to connect both supply passages to said intake passage to supply a varying mixture of air and fuel thereto and then to cut off the air supply passage and supply fuel from the fuel supply passage during the suction intake stroke of each cylinder through the port corresponding to said cylinder.

6. The combination with an internal combustion engine having fuel intake passages of separate air and fuel supply passages, a valve casing between said supply passages and said fuel intake passages, a valve in said casing and means operating said valve to supply a fuel mixture of varying richness during each suction stroke of said engine and means for varying the opening from said air supply passage, the point at which said air port is opened remaining constant with respect to the suction stroke of the engine.

7. The combination with an internal combustion engine having fuel intake passages, of separate air and fuel supply passages, a valve casing between said supply passages and said fuel intake passages, a valve in said casing operative to connect said supply passages individually and collectively to said intake passages and means in said valve casing to vary the opening of said air supply passage to said valve.

8. The combination with an internal combustion engine having fuel intake passages, of separate air and fuel supply passages, a valve casing between said supply passages and said fuel intake passages, a valve in said casing operative to connect said supply passages individually and collectively to said fuel intake passages and means in said valve casing to vary the opening of said air supply passage to said valve, said means being operative to close said fuel supply passage to said valve.

9. The combination with an internal combustion engine having fuel intake passages of separate air and fuel supply passages, a valve casing between said supply passages and said fuel intake passages, a valve in said casing operative to connect said supply passages individually and collectively to said fuel intake passages and means in said casing operative to vary the openings of said air and fuel supply passages to said valve.

10. The combination with an internal combustion engine having fuel intake passages of separate air and fuel supply passages, a valve casing between said supply passages and said fuel intake passages, a valve in said casing operative to connect said supply passages individually and collectively to said fuel intake passages and means in said casing operative to vary the openings of said air and fuel supply passages to said valve, said means being operative to close said fuel supply passage while maintaining said air supply passage to said valve open.

11. The combination with an internal combustion engine having fuel intake passages, of separate air and fuel supply passages, a valve casing between said supply passages and said fuel intake passages, a valve in said casing, means operating said valve to control the connection of said supply passages to said fuel intake passages, means to vary the effective areas of said supply passages simultaneously and means to vary the openings of said supply passages to said valve chamber.

12. The combination with an internal combustion engine having fuel intake passages of separate air and fuel supply passages, a valve casing between said supply passages and said fuel intake passages and a valve in said casing operative to connect said passages, said valve admitting fuel at the beginning of said suction stroke and then admitting air to the fuel stream during an initial portion of the suction stroke.

13. The combination with an internal combustion engine and means to supply a fuel stream thereto of a valve for supplying air to the fuel stream and means operating said valve to supply fuel at the beginning of said suction stroke and then supply air to the fuel stream during an initial portion of the suction stroke of the engine.

JULIUS M. ULRICH.